US007124670B2

(12) United States Patent
Tanaka et al.

(10) Patent No.: US 7,124,670 B2
(45) Date of Patent: Oct. 24, 2006

(54) METHOD AND APPARATUS FOR ESTIMATING A LIFE-SPAN OF A CUTTER

(75) Inventors: Shigeru Tanaka, Kanagawa (JP); Shigeki Morisawa, Mie-ken (JP)

(73) Assignee: Fuji Photo Film Co., Ltd., Kangawa (JP)

( * ) Notice: Subject to any disclaimer, the term of this patent is extended or adjusted under 35 U.S.C. 154(b) by 0 days.

(21) Appl. No.: 09/909,988

(22) Filed: Jul. 23, 2001

(65) Prior Publication Data

US 2003/0015076 A1 Jan. 23, 2003

(30) Foreign Application Priority Data

Jul. 21, 2001 (JP) ............................ 2000-220786

(51) Int. Cl.
*B26D 5/00* (2006.01)
*B23Q 15/00* (2006.01)

(52) U.S. Cl. .............................. 83/62; 83/62.1; 83/72; 83/76.7; 83/522.27; 83/614

(58) Field of Classification Search ............ 83/522.27, 83/522.11, 72, 76.7, DIG. 1, 614, 62, 62.1
See application file for complete search history.

(56) References Cited

U.S. PATENT DOCUMENTS 3,706,373 A * 12/1972 Smith .......................... 83/106
3,742,795 A * 7/1973 Lipcon et al. ................. 83/72
3,760,667 A * 9/1973 Maxey et al. ............ 83/522.11
4,214,191 A * 7/1980 Watanabe et al. ........ 83/522.29
4,383,458 A * 5/1983 Kitai et al. ................... 83/455
4,398,136 A * 8/1983 Tanaka ....................... 318/561
4,404,506 A * 9/1983 Nishimura et al. .......... 318/561
4,442,493 A * 4/1984 Wakai et al. ................ 83/62.1
4,979,838 A * 12/1990 Yokota et al. .............. 400/621
5,303,574 A * 4/1994 Matossian et al. ....... 83/522.27
5,304,905 A * 4/1994 Iwasaki ...................... 318/561
5,613,415 A * 3/1997 Sanpei ........................ 83/455
5,787,778 A * 8/1998 Saito et al. ................... 83/455
5,970,831 A * 10/1999 Mattinger et al. ....... 83/522.11
6,176,166 B1 * 1/2001 Mattinger et al. ....... 83/522.11
6,208,159 B1 * 3/2001 Klosterman ................. 318/434
6,286,403 B1 * 9/2001 Rosenthal et al. ............ 83/614
6,302,602 B1 * 10/2001 Kiyohara et al. ............. 83/614
6,302,605 B1 * 10/2001 Kanbe ......................... 83/614
6,337,705 B1 * 1/2002 Tanaka et al. .............. 347/213
6,681,667 B1 * 1/2004 Kohda et al. ................. 83/614
2001/0039866 A1 * 11/2001 Kohda et al. ................. 83/614
2005/0229756 A1 * 10/2005 Tanaka et al. ................. 83/13

* cited by examiner

*Primary Examiner*—Timothy V. Eley
*Assistant Examiner*—Jason Prone
(74) *Attorney, Agent, or Firm*—Sughrue Mion, PLLC

(57) ABSTRACT

An apparatus for estimating a lifetime of a cutter for cutting a sheet comprising: a detector for detecting a value of a parameter representing a cutting resistance during sheet cutting; a comparator for comparing the detected value of the parameter with a predetermined reference value; and an output element for outputting a result based on the comparison.

9 Claims, 10 Drawing Sheets

METHOD AND APPARATUS FOR ESTIMATING A LIFE-SPAN OF A CUTTER

BACKGROUND OF THE INVENTION

1. Field of the Invention

The present invention relates to a method and apparatus for estimating a life-span of a cutter by which a sheet member that is conveyed on conveyor rollers or the like, is cut. The sheet member may be a paper strip, thin film, cloth or the like that is adapted for image-formation.

2. Description of the Related Art

In an ordinary thermal-transfer type image-forming apparatus in which an image exposed on a photosensitive material is thermally transferred onto an image-receiving sheet, the photosensitive material is firstly unwound and pulled out by a certain length from a magazine, and thereafter a piece or sheet of photosensitive material is cut off therefrom. The sheet-form piece of photosensitive material is then conveyed to an exposure section.

In the exposure section, an image is exposed onto the photosensitive material. The image-exposed photosensitive material then has water applied thereto, and is thereafter conveyed to a transfer section. In the transfer section, the photosensitive material is overlapped with the image-receiving sheet, wound together with the image-receiving sheet around a heating drum, and pressed onto the heating drum for a predetermined length of time, so that the image on the photosensitive material is thermally transferred to the image-receiving sheet.

The image-receiving sheet is accommodated in a magazine in a wound state. After a predetermined length of the image-receiving sheet has been unwound, a desired length of the image-receiving sheet is cut off by a sheet cutter 92 for cutting the image-receiving sheet, as shown in FIG. 9. The cut-off image-receiving sheet is then conveyed to a transfer section.

The sheet cutter 92 features a rotary blade 98 and a fixed blade 94 with an elongated plate shape. When the rotary blade 98 moves along the fixed blade 94 while rotating, an image-receiving sheet P which is conveyed and disposed over the fixed blade 94 is cut by an engaging portion between the rotary blade 98 and the fixed blade 94.

As the number of cuttings increases, the edge of the rotary blade 98 becomes worn or unfit for use. Due to this wear, during cutting, burrs K and warp would inevitably be generated at an edge of the piece of the image-receiving sheet P, as shown in FIG. 10. Thus, when the sheet piece was overlapped with a photosensitive material, a small space is generated therebetween due to burrs and warp, which might cause a poor picture, e.g., a so-called "white clarity". Sheet jamming would also be generated due to poor cutting.

At present, in general, the rotary cutter is not regarded as unfit for use and is not replaced until immediately before problems such as poor picture, jamming and the like become apparent. In brief, the method of replacing a cutter in use with a new one is not a systematic method based on predetermined criteria.

SUMMARY OF THE INVENTION

In light of the above-mentioned fact, a primary object of the present invention is to provide a method and/or apparatus for estimating a life-span of a cutter wherein the cutter is reliably changed before burrs and warp are generated at an edge of a sheet piece that is cut by the cutter, by estimating when the cutter is unfit for use.

In order to solve the aforementioned problems, according to the present invention, there is provided an apparatus of estimating a lifetime of a cutter for cutting a sheet comprising: a detector for detecting a value of a parameter representing a cutting resistance during sheet cutting; a comparator for comparing the detected value of the parameter with a predetermined reference value; and an output element for outputting a result based on the comparison.

In accordance with another aspect of the present invention, there is provided a method of estimating a lifetime of a cutter for cutting a sheet comprising the steps of: (a) detecting a value of a parameter representing a cutting resistance during sheet cutting; (b) comparing the detected value of the parameter with a predetermined reference value; and (c) outputting a result based on the comparison.

In accordance with yet another aspect of the present invention, there is provided a sheet cutter for cutting a sheet piece from a sheet by shearing, the sheet cutter comprising a fixed blade; a movable blade which is movable along the fixed blade; and a life estimation element for estimating a life span of the movable blade.

In accordance with yet another aspect of the present invention, there is provided a sheet cutter for cutting a sheet piece from a sheet by shearing, the sheet cutter comprising: a fixed blade; a movable blade which is movable along the fixed blade; a receiving element which receives the sheet piece that is cut off from the sheet, the receiving element being structured so as to be movable together with the movable blade; and a life estimation element for estimating a life span of the movable blade.

The foregoing and other objects, features and advantages of the present invention will be apparent from the following description of a preferred embodiment of the invention, as illustrated in the accompanying drawings.

DESCRIPTION OF THE PREFERRED EMBODIMENTS

Figure 1:
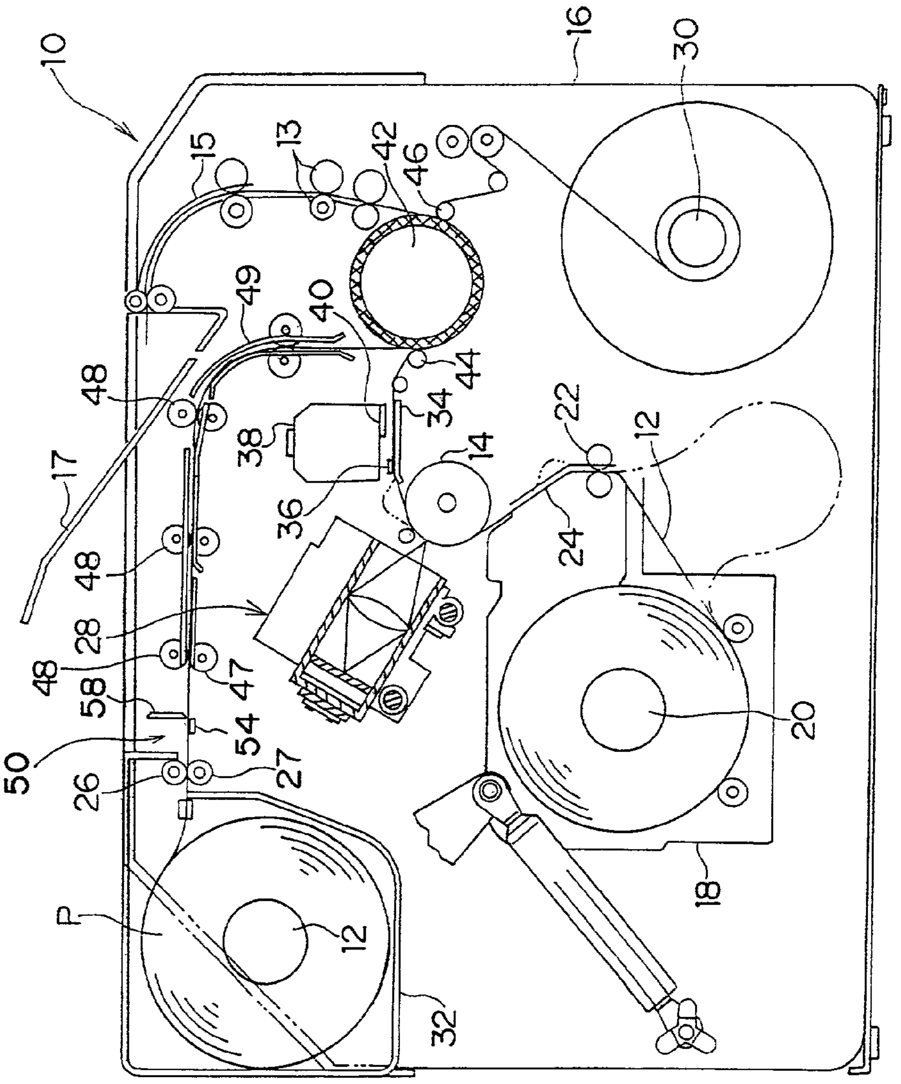
FIG. 1 is a general side view of an image-forming device in which a life-span estimation apparatus of a cutter according to a first embodiment of the present invention is provided.

In FIG. 1, there is generally shown an image-forming apparatus 10 provided with a life-span estimation apparatus of a cutter according to an embodiment of the present invention.

At a lower side within a housing 16 of the image-forming apparatus 10 is disposed a photosensitive material magazine 18 in which a photosensitive material 12 is set and wound-up around a supply reel 20. The supply reel 20 is driven for rotation by a driving means (not illustrated) so as to unwind the photosensitive material 12.

A distal end of the photosensitive material 12 is nipped by pulling-out rollers 22 that are provided at a securing section for the photosensitive material magazine 18. Under predetermined conditions, the pulling-out rollers 22 pull the photosensitive material and feed the same toward guide plates 24 or define a further buffer (indicated by a two-dotted line).

On passing through the guide plates 24, the photosensitive material 12 is wound around an exposure drum 14 and then image-exposed by a scanning head 28. Because the photosensitive material 12 is wound onto the exposure drum 14 and image-exposed in the manner described above, it is possible to avoid generation of winkles or creases with respect to the widthwise direction of the photosensitive material 12. Thus, flatness of the exposed surface can be maintained at a high level.

The image-exposed photosensitive material 12 is sandwiched between a support table 34 and a pressure plate 36, and is supplied with water by an application member 40 (a sponge or the like). The application member 40, which is water absorptive, is provided at an application tank 38.

The water-applied photosensitive material 12 is wound around a heating drum 42 with a predetermined constant pressure by tension rollers 44 and 46. The heating drum 42 has a halogen lamp incorporated therein. While the wound photosensitive material is heated, it is superposed with an upper surface of an image-receiving sheet hereinafter referred to as a "sheet") P described in detail hereinbelow, onto which the image is transferred.

Next, the image-transferred photosensitive material 12 is wound around a scrap reel 30. As described above, the photosensitive material 12 is delivered not in a cut-off sheet manner but in a consecutive web manner from the supply reel 20 to the scrap reel 30. Therefore, the photosensitive material 12 itself functions as a timing belt which applies a certain constant pressure to the sheet P.

At an upper side within the housing 16 is disposed a sheet magazine 32, in which the sheet P is wound around a supply 12. The sheet P is nipped and unwound by nipping rollers 26 and 27, and thereafter a sheet piece having a predetermined length is cut off therefrom by a sheet cutter 50, details of which will be described hereinbelow. Then, the sheet piece is conveyed by guidance of conveyor rollers 47, 48 and guide plates 49 and wound around the heating drum 42 together with the photosensitive material in an overlapping manner.

The image recorded on the photosensitive material 12 is transferred to the sheet piece P. Thereafter, the image-transferred sheet piece is separated from the heating drum 42 and from the photosensitive material by a separation claw (not illustrated), conveyed under guidance of conveyor rollers 13 and guide plates 15, and led to a receiving tray 17.

Figure 2:
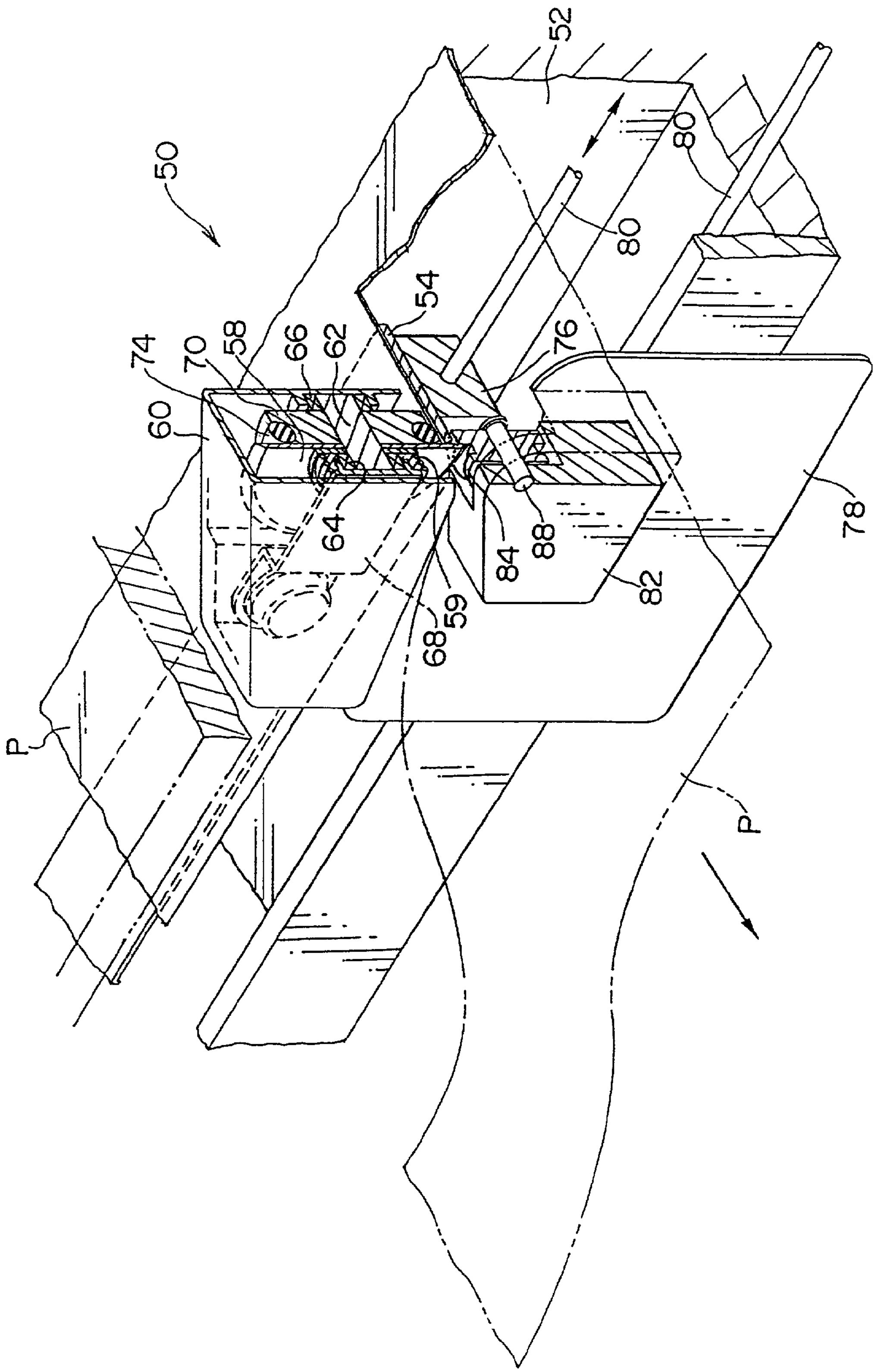
FIG. 2 is a perspective view illustrating a sheet cutter according to the first embodiment of the present invention.
Figure 3:
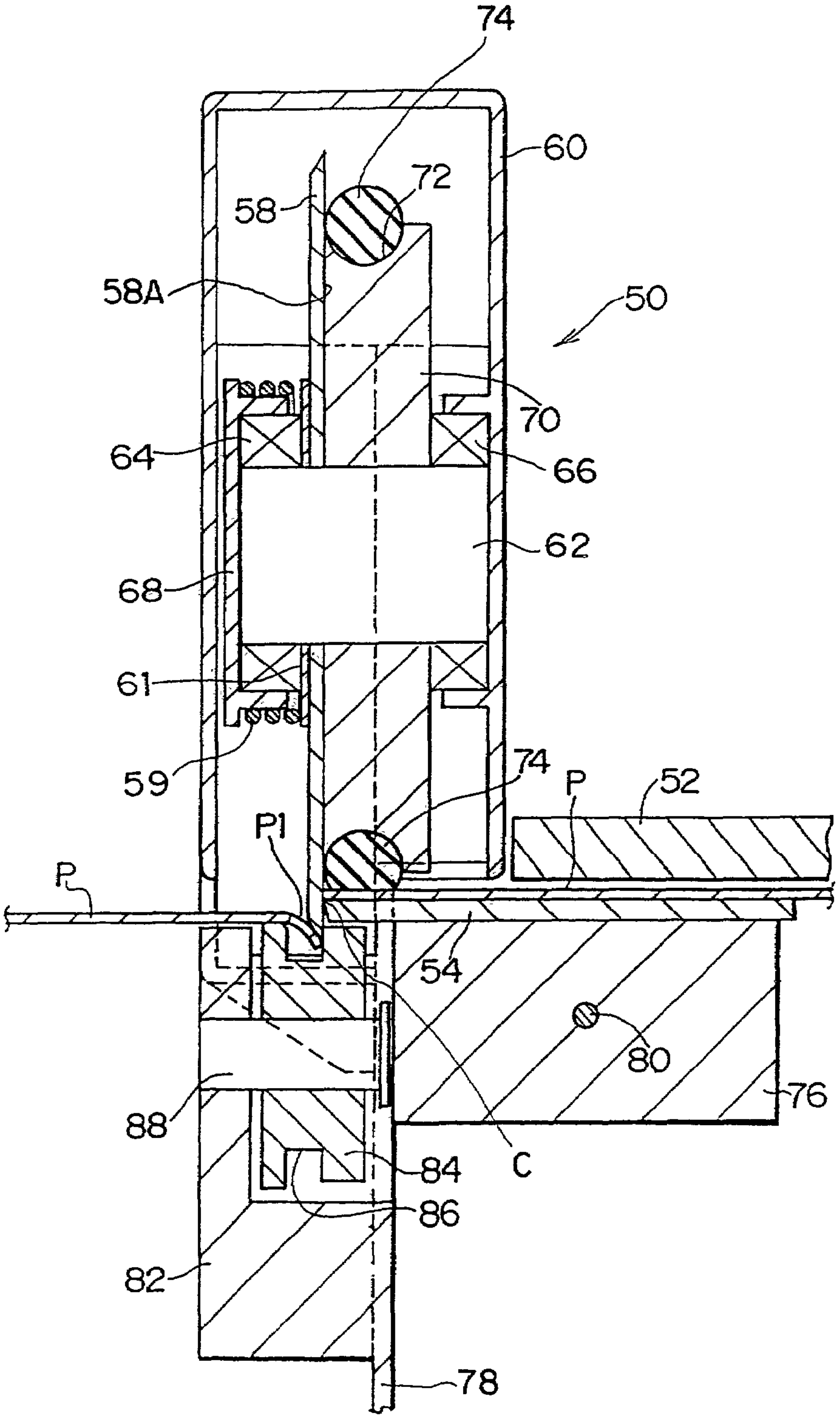
FIG. 3 is a cross sectional view illustrating the sheet cutter of the life-span estimation apparatus of a cutter according to the first embodiment of the present invention.

With reference to FIGS. 2 and 3, the sheet cutter 50 will now be described in detail. A guide rail 52 is disposed in the sheet cutter 50 substantially perpendicular to a sheet conveying direction (indicated by bidirectional arrow), i.e., a sheet width direction. To this guide rail 52 is secured a fixed blade 54 of elongated plate shape, whose length is greater than the width of the sheet P that is coiled and stored in the sheet magazine 32.

The sheet P is conveyed through an elongated slit formed in the guide rail 52 and conveyed over the fixed blade 54. Above the fixed blade 54 is disposed an upper housing 60 which accommodates a (single-edged) rotary blade 58, part of which is exposed.

The rotary blade 58 has a rotatable shaft 62 with two ends, both of which ends are rotatably supported by bearings 64 and 66. The bearing 64 is secured to a cantilever-type plate member 68. Between the plate member 68 and a disk plate 61 is provided a coil spring 59 which biases the rotary blade 58 toward the fixed blade 54. Thus, a side surface 58A of the rotary blade 58 is pressed to the fixed blade 54 at a cutting point C (see FIG. 3). The fixed blade 54 has an upper surface and an inclined, relief surface, with these surfaces meeting at the cutting point C and forming an angle with each other (e.g., around 80°). When the rotary blade 58 is moved along the fixed blade 54, the rotary blade 58 rotates due to friction, so that the sheet P is reliably cut at the cutting point C.

Also, a disk plate 70 is concentrically fixed to the rotatable shaft 62 of the rotary blade 58. The disk plate 70 has a groove 72 circumferentially defined in the external surface thereof. A seal ring, that is, an O-ring 74, is received in this groove 72. The O-ring 74 is in a slightly compressed state when moved on the upper surface of the fixed blade 54 during rotation.

A slider 76 is disposed under the fixed blade 54 such that the slider 76 opposes the O-ring 74. The slider 76 is connected to the upper housing 60 via a connection plate 78 and slides along a back surface of the fixed blade 54. The fixed blade 54 is maintained between the O-ring 74 and the slider 76 such that up and down movement of the rotary blade 58 with respect to the fixed blade 54 is restricted.

Figure 4:
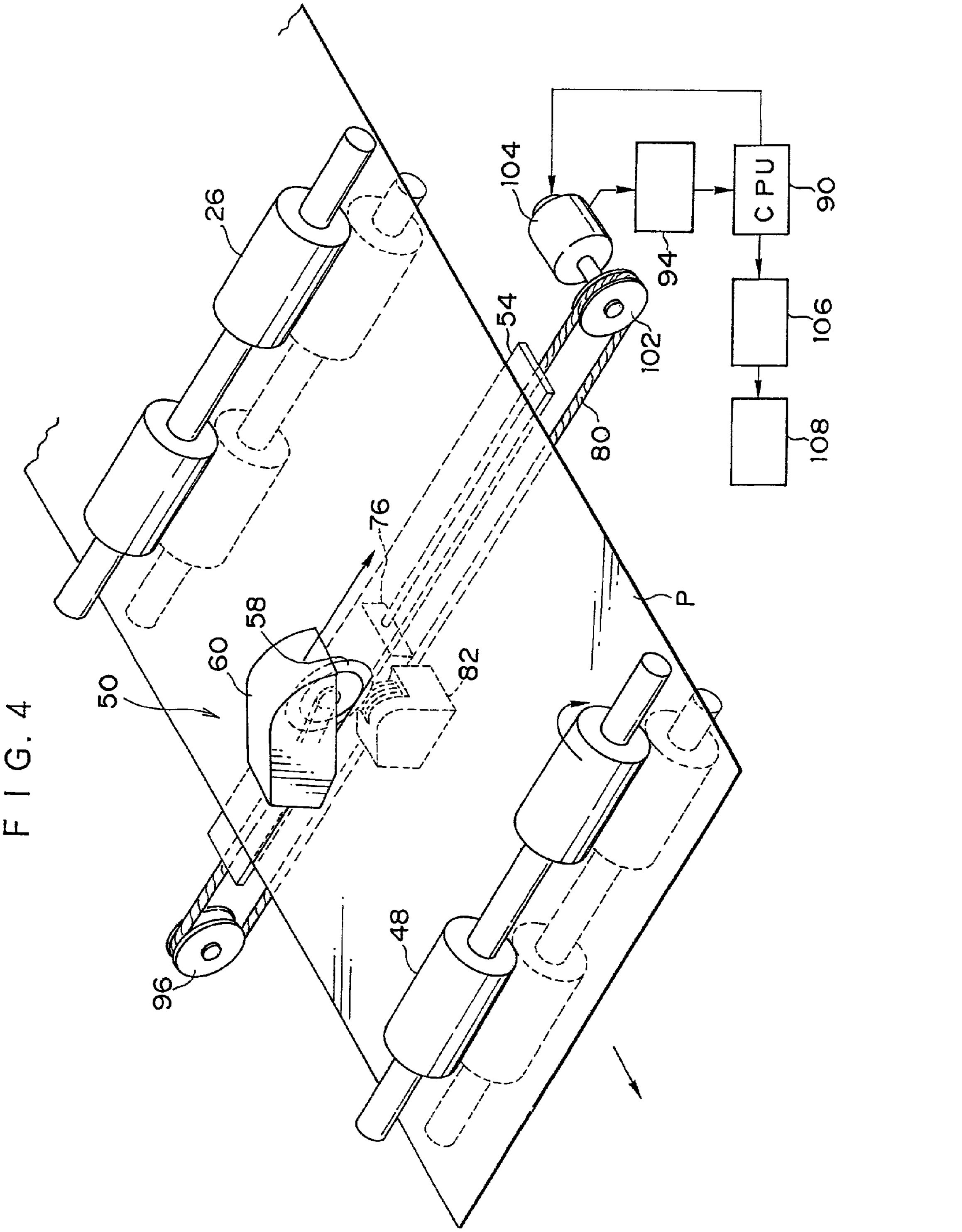
FIG. 4 is an overall perspective view including a block diagram which illustrates the sheet cutter incorporating the life-span estimation apparatus according to the first embodiment of the present invention.

Further, to the slider 76 is fixed an endless wire 80 which is wound around pulleys 96 and 102, as shown in FIG. 4. The pulleys 96 and 102 are disposed at each end of the guide rail 52. Power from a motor (e.g., a stepping motor) is transmitted to the pulley 102 through a reduction gear (not illustrated).

In this structure, when the sheet P has advanced to a cutting position, the motor 104 usually rotates according to the later described timing, and the upper housing 60 and the slider 76 are moved along the fixed blade 54. At this time, the rotary blade 58 cuts the sheet P in the sheet width direction at the cutting point C defined with the fixed blade 54. When the motor is operated in a reverse direction, the slider 76 and the upper housing 60 are pulled back to a standby position.

Further, a lower housing 82 is fixed to the connection plate 78 and moves integrally with the upper housing 60. The lower housing 82 includes a rotation shaft 88 and a receiving roller 84, which serves as a receiving member, is made of metal, and is rotatably supported by the rotation shaft 88. The receiving roller 84 has a groove 86 circumferentially defined in the external surface thereof such that the edge of the rotary blade 58 is accommodated in the groove 86.

Specifically, in the present embodiment, in which the rotary blade 58 and the receiving roller 84 are moved integrally, at the time the image-receiving sheet P is cut, a trailing edge portion of a piece of image-receiving sheet, which is cut off, is bent down and enters into the groove 86, as shown in FIG. 3. In short, a bent-down or hung-down portion P1 of the sheet edge of the piece is purposely formed so as to suppress or eliminate generation of burrs.

Figure 5:
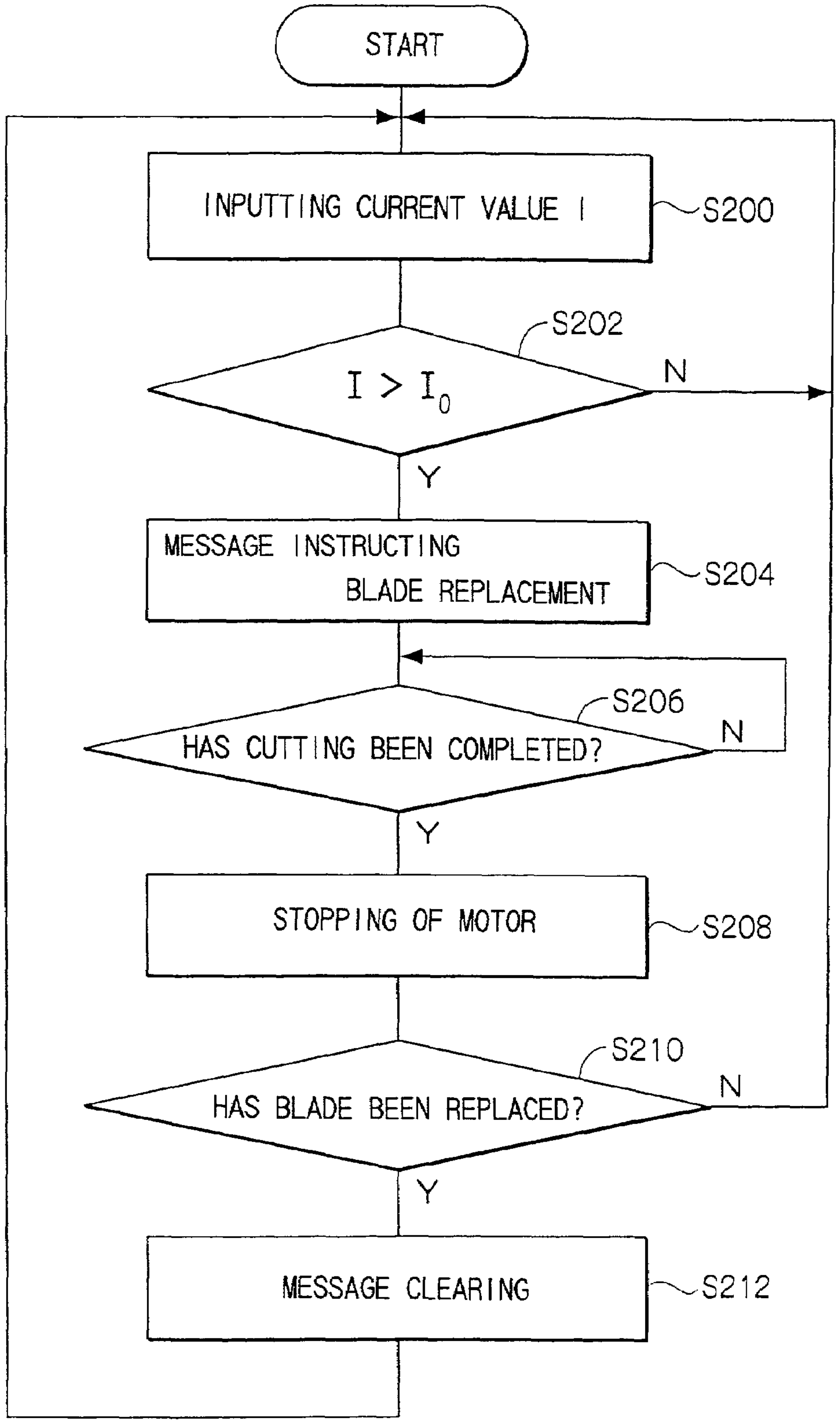
FIG. 5 is a flowchart of the life-span estimation apparatus of a cutter according to the first embodiment of the present invention.

Next, description will be made of the life-span estimation apparatus of a cutter of the embodiment with reference to FIGS. 4 to 6.

The motor 104 which transmits power to the pulley 102 as described above, is connected to a current measurement equipment 94 (a non-limiting example of a detector) which is in turn connected to a central processing unit (hereinafter referred to as a "CPU") 90. At the time the sheet P is cut by the rotary blade 58, the current measurement equipment 94 measures the value of electric current of the motor 104. The CPU 90 (a non-limiting example of a comparator) then compares this value with a reference current value.

The CPU 90 is connected to a display control unit 106 which is in turn connected to a display 108 (a non-limiting example of an output element). When the current value measured exceeds the reference, the CPU 90, via the display control unit 106, causes the display 108 to indicate that the rotary blade 58 should be replaced.

Specifically, if the cutting edge of the rotary blade 58 has worn out, cutting resistance would increase, thereby resulting in a large load on the motor 104, and therefore, the current value of the motor would necessarily go up. By using this phenomenon to determine when the rotary blade 58 should be replaced because it is unfit for use, it is possible to ensure that the rotary blade or cutter is replaced with a new one in a timely manner and thus prevent burrs and warp from being generated on the sheet P.

Operation of the life-span estimation apparatus of a cutter will now be described with reference to a flowchart shown in FIG. 5.

At step S200, the present current value I of the motor 104 is input, and at step S202, it is determined whether the present current value I exceeds the predetermined reference current value Io. At step S 204, if the former exceeds the latter, the CPU 90, via the display control unit 106, causes the display 108 to display an indication, e.g., a message indicating that the rotary blade 58 should be replaced.

Next, at step S206, it is determined whether the sheet cutting by the rotary blade 58 has been completed. When the cutting has been completed, at step S208, rotation of the motor 104 for driving the rotary blade to move is stopped. At step S210, it is determined whether the rotary blade 58 has been replaced.

After replacing the rotary blade, the message in the display 108 is cleared at step S212. The routine is returned to step S200. At step S202, if the current value I does not exceed the predetermined reference current value, the routine loops back to step S200.

Figure 6:
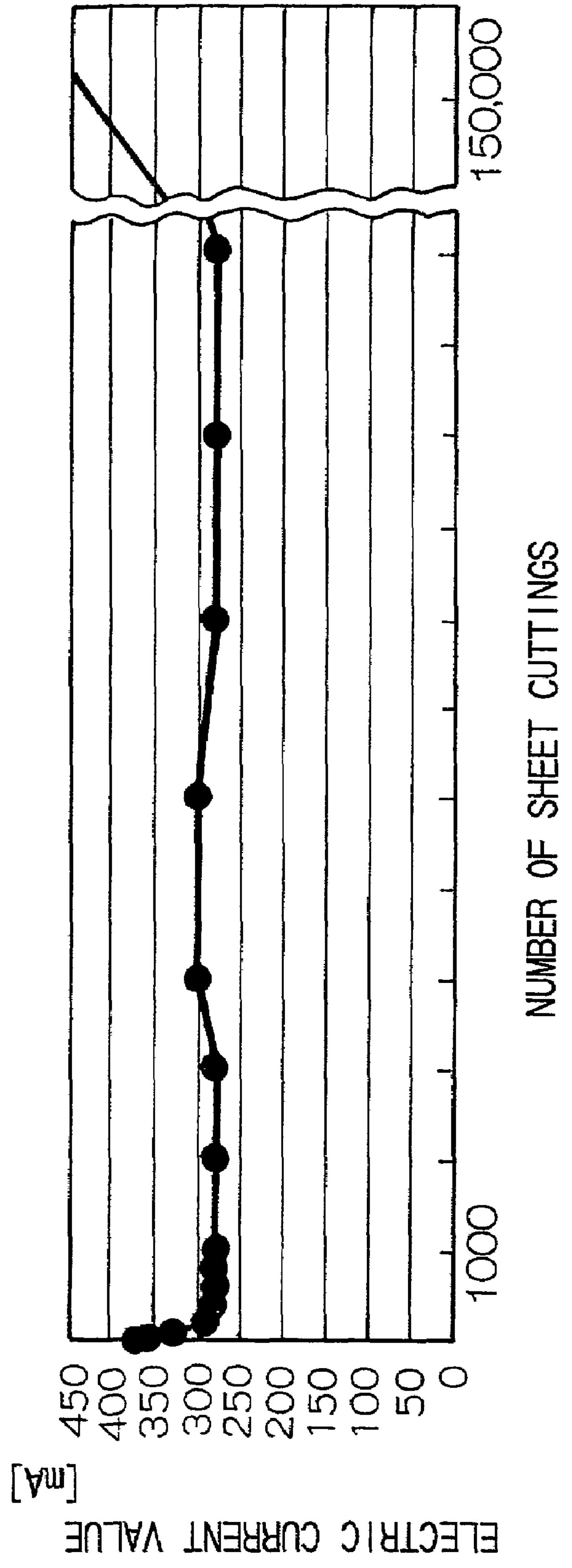
FIG. 6 is a chart showing an endurance test result obtained in the life-span estimation apparatus of a cutter according to the first embodiment of the present invention.

A description will now be made of the relationship between the cutting time and the number of cuttings (or the number of sheets cut), with reference to FIG. 6 showing a cutter or blade endurance test chart.

It will be noted that attention should be paid to variation or changing (i.e., shape or curves) in the plot of electric current rather than current value itself.

In the initial period of use of a rotary blade or when using a new rotary blade, the rotary blade is not accustomed to cutting, and therefore, cutting resistance is fairly large, thereby resulting in a high load on the motor 104. For example, the electric current value of the motor sometimes tends to go up to around 350 [mA] when cutting a sheet However, when the number of sheets cut exceeds about 1,000, the rotary blade starts to become accustomed to cutting, and therefore, the electric current value decreases to around 270 [mA] and is stably maintained at such a lower level. When the number of sheet cutting is over around 120,000, the electric current value gradually goes up. Those numbers are only examples and vary depending on several factors, i.e., sheet material, cutter material, parts dimensions, etc.

As described above, in the present embodiment, a life span of a blade or cutter can be estimated by measuring an electric current value of a motor for driving the blade or cutter. Further, blade trouble like blade breakage and/or generation of sheet jamming can be anticipated. In place of or in addition to displaying a message that the blade or cutter should be replaced, visual or audible warning (another non-limiting example of an output element) to users may simply be provided.

Next, a life-span estimation apparatus of a cutter of another embodiment according to the present invention will be described with reference to FIGS. 7 and 8.

Figure 7:
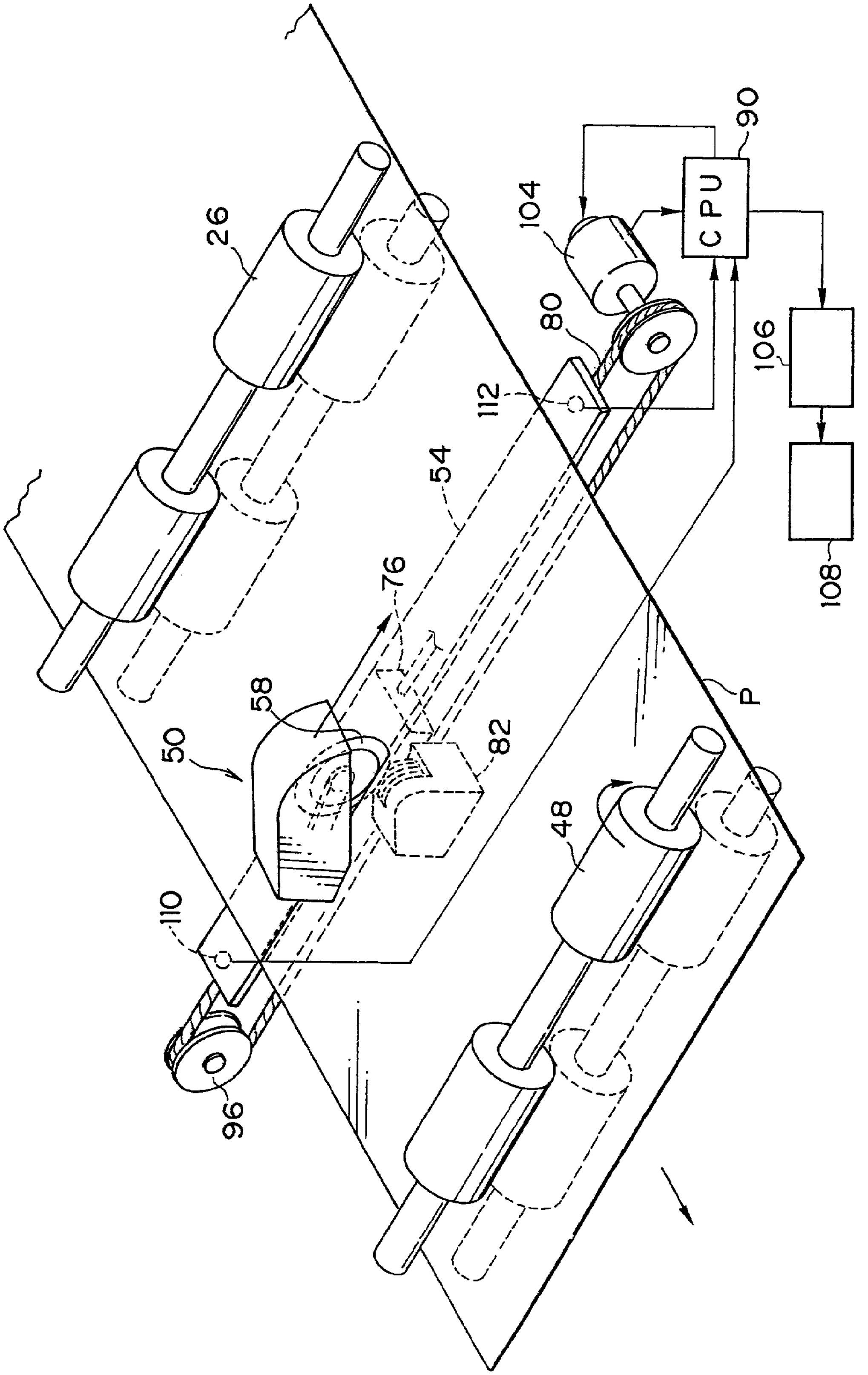
FIG. 7 is an overall perspective view including a block diagram which illustrates a sheet cutter according to a second embodiment of the present invention.
Figure 8:
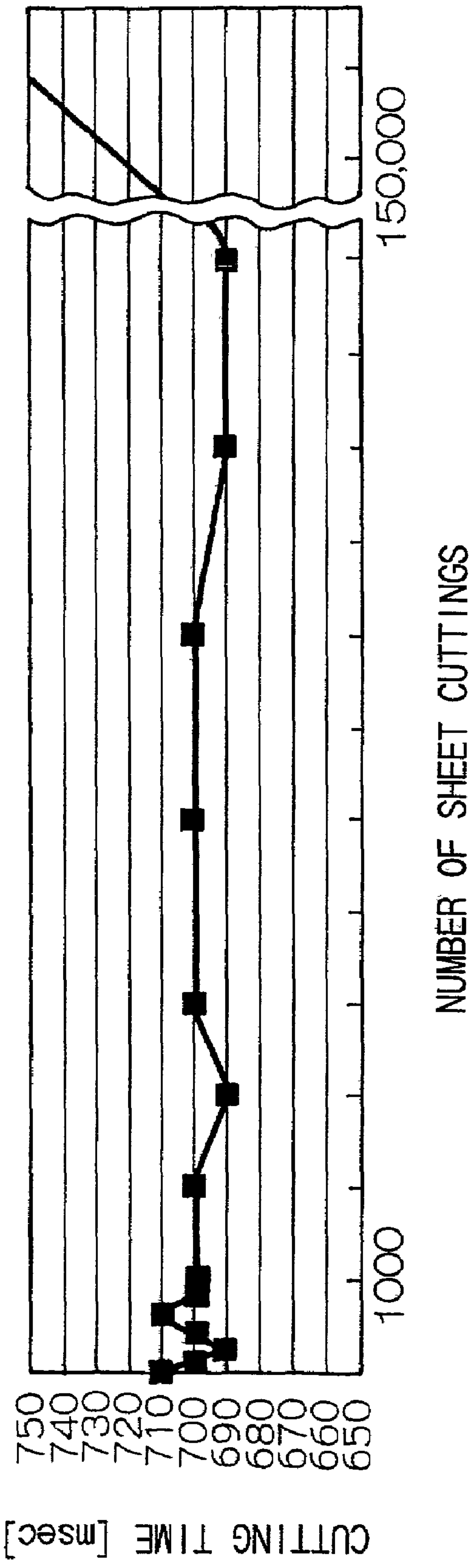
FIG. 8 is a chart showing an endurance test result obtained in the life-span estimation apparatus of a cutter according to the second embodiment of the present invention.
Figure 9:
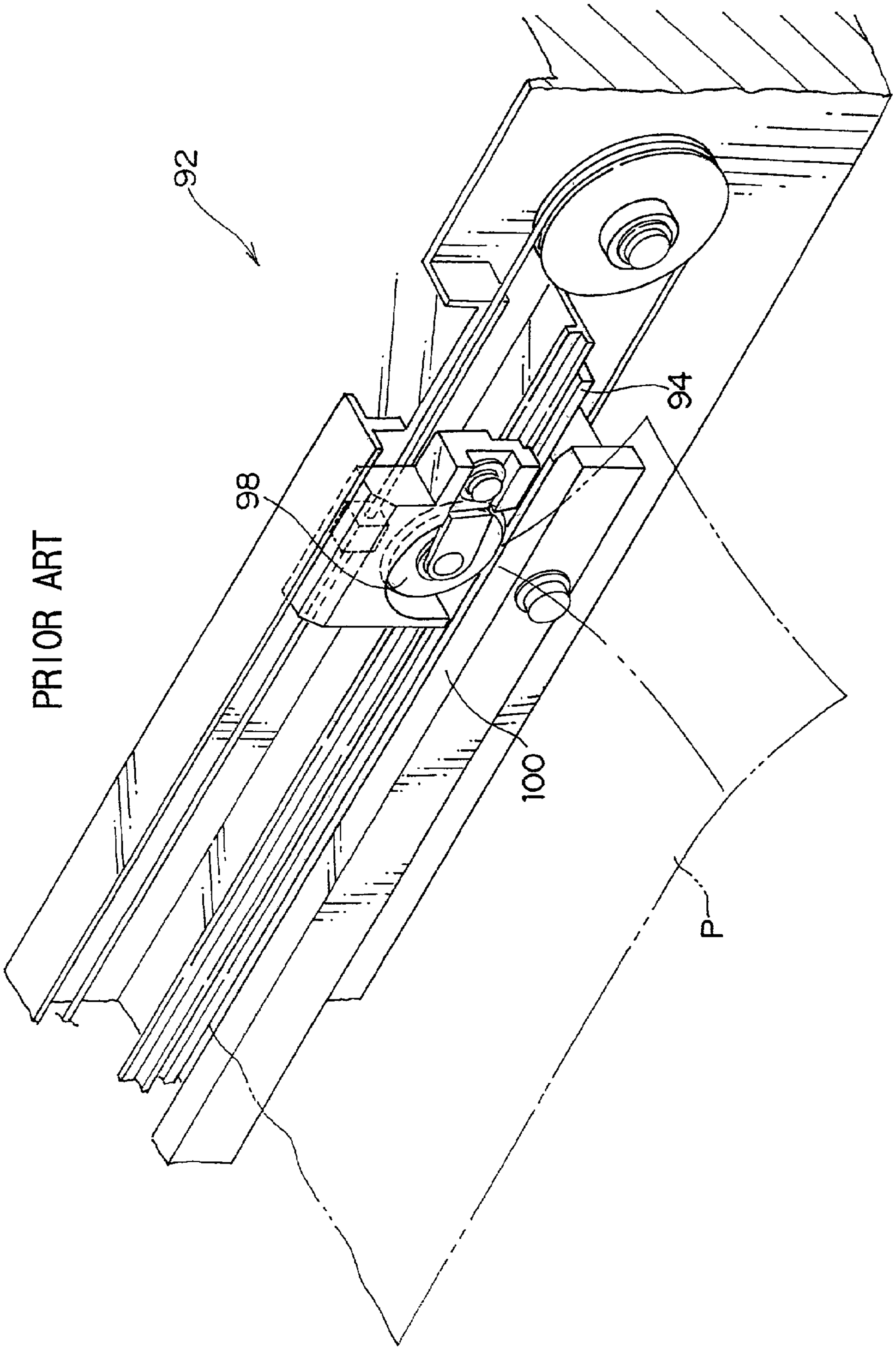
F I G. 9 PRIOR ART
FIG. 9 is a perspective view illustrating a conventional cutter in a state in which it is cutting a paper sheet.
Figure 10:
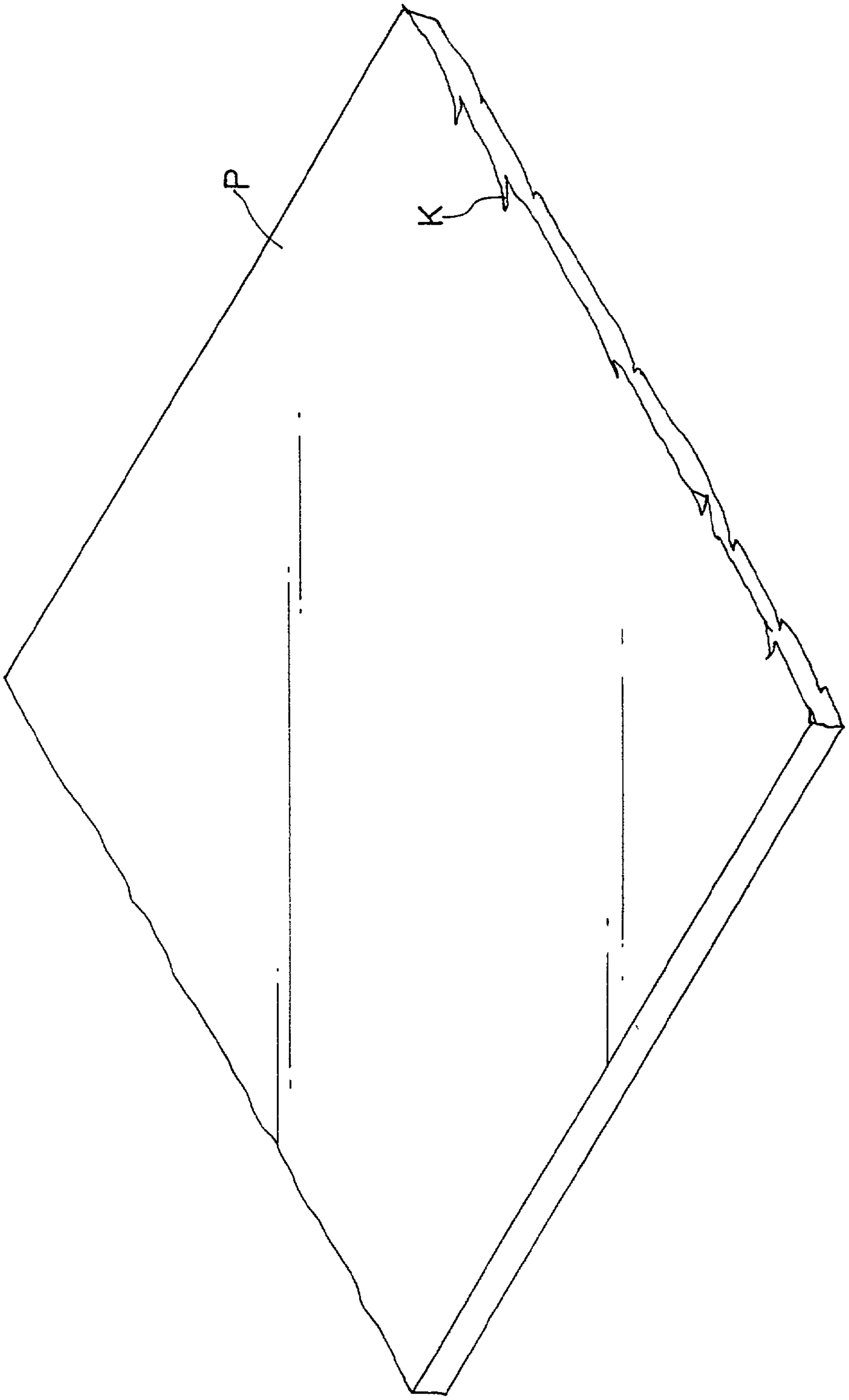
FIG. 10 PRIOR ART
FIG. 10 is a view illustrating a sheet in which there are burrs at a sheet edge of an image-receiving sheet.

As shown in FIG. 7, this structure is provided with two touch sensors 110 and 112 (another non-limiting example of a detector), each of which is disposed in the vicinity of each end of the fixed blade 54. As soon as the rotary blade 58 starts cutting of the sheet P, the slider 76 is brought out of contact with the touch sensor 110. At this moment, an electric circuit included in the touch sensor 110 accordingly operates and outputs a signal (i.e., a cutting start signal) to the CPU 90. Next, as soon as the rotary blade 58 completes cutting of the sheet P, the slider 76 is brought into contact with the touch sensor 112. Correspondingly, the touch sensor 112 outputs a signal (i.e., a cutting completion signal) to the CPU 90.

In the CPU 90, time between receiving the cutting start signal and receiving the cutting completion signal is regarded as a cutting time required for the rotary blade 58 to cut the sheet P. Then, the CPU compares this time with the predetermined reference cutting time.

When the cutting time measured exceeds the predetermined reference time for cutting, the CPU 90 causes the display 108, via the display control unit 106, to indicate that the rotary blade 58 should be replaced.

Description will now be made of the relationship between the cutting time and the number of cuttings (or the number of sheets cut), with reference to FIG. 8 which shows an endurance test chart for cutters or blades.

It will be noted that attention should be paid to variation or changing (i.e., shape or curves) in the plot of cutting time rather than the value of cutting time itself.

In the initial period of use of a rotary blade or when using a new rotary blade, the rotary blade is not accustomed to cutting, and therefore, cutting resistance is fairly large, thereby resulting in a long cutting time. For example, the cutting time sometimes tends to go up to around 710 [msec] when cutting a sheet. However, when the number of sheet cutting is over around 5,000, the rotary blade starts to get use to cutting, and therefore, the cutting time value decreases to around 700~690 [msec] and is stably maintained at such a lower level. When the number of sheet cutting exceeds about 120,000, the cutting time gradually increases. Those numbers are only examples and vary depending on several factors, i.e., sheet material, cutter material, parts dimensions, etc.

As described above, in the present embodiment, a life span of a rotary blade 58 can be estimated by measuring a cutting time when the blade cuts a sheet.

According to the above exemplary structures of the present invention, life span of a cutter or blade can be precisely estimated, and therefore, the cutter or blade can be replaced in a timely manner to prevent poor cutting which may cause burrs and warp at sheet edges during cutting.

Incidentally, it is conceivable that by counting a frequency of cutting or number of times a rotary blade is used, a life span of the rotary blade can be estimated. However, the frequency or number of cutting varies depending on properties of materials constituting the rotary blade. Therefore, in this way of estimation, it is difficult to achieve an accurate or timely estimation with respect to the rotary blade. Namely, this may result in an undesirable situation in which the rotary blade is replaced although it is not yet the time for the rotary blade to be replaced or the rotary blade is not replaced although it is past the time for the rotary blade to be replaced.

In this respect, according to the instant invention, there is provided an improved estimating system in which the above-described problems are eliminated.

What is claimed is:

1. A method of estimating a lifetime of a sheet cutter for cutting a sheet piece from a sheet by shearing, wherein the sheet cutter comprises a fixed blade; a movable blade which is movable along the fixed blade; and an apparatus for estimating a lifetime of the movable blade for cutting a sheet; and a receiving element that receives a sheet piece that is cut off from the sheet; said method comprising the steps of:

(a) detecting a value of a parameter representing a cutting resistance during sheet cutting, wherein the parameter is a value of a current that is loaded onto a motor for driving the cutter;

(b) comparing the detected value of the parameter with a predetermined reference value, wherein it is determined that the movable blade is unfit for use when the value of the parameter exceeds the predetermined reference value; and (c) outputting a result based on the comparison;

wherein the movable blade comprises a disk which is rotatably supported, and the receiving element comprises a roller which is rotatably supported, and wherein the receiving element is vertically coplanar with the movable blade.

2. A sheet cutter for cutting a sheet piece from a sheet by shearing, the sheet cutter comprising:

a fixed blade;

a movable blade which is movable along the fixed blade; and an apparatus for estimating a lifetime of the movable blade, comprising a motor for driving the movable blade;

a detector for detecting a value of a parameter representing a cutting resistance during sheet cutting, wherein the parameter is a value of a current loaded on the motor;

a comparator for comparing the detected value of the parameter with a predetermined reference value, wherein the comparator determines that the movable blade is unfit for use when the value of the parameter exceeds the predetermined reference value;

an output element for outputting a result based on the comparison; and a receiving element that receives a sheet piece that is cut off from the sheet, wherein the movable blade comprises a disk which is rotatably supported, and the receiving element comprises a roller which is rotatably supported, and wherein the receiving element is vertically coplanar with the movable blade.

3. The apparatus of claim 2, wherein the detector comprises an ammeter for measuring the value of the current.

4. The apparatus of claim 2, wherein the comparator is included in a microcomputer.

5. The apparatus of claim 2, wherein the output element comprises a visual display.

6. The sheet cutter for cutting a sheet piece from a sheet by shearing of claim 2, wherein the receiving element is structured so as to be movable together with the movable blade.

7. The sheet cutter of claim 6, further comprising a support for supporting the movable blade and a support for supporting the receiving element, the supports being substantially integral with each other.

8. A sheet cutter for cutting a sheet piece from a sheet by shearing, the sheet cutter comprising:

a fixed blade;

a movable blade which is movable along the fixed blade; and an apparatus for estimating a lifetime of the movable blade, comprising a motor for driving the movable blade;

a detector for detecting a value of a parameter representing a cutting resistance during sheet cutting, wherein the parameter is a value of a current loaded on the motor;

a comparator for comparing the detected value of the parameter with a predetermined reference value, wherein the comparator determines that the movable blade is unfit for use when the value of the parameter exceeds the predetermined reference value; and an output element for outputting a result based on the comparison;

a receiving element which receives a sheet piece that is cut off from the sheet, the receiving element being structured so as to be movable together with the movable blade, wherein the receiving element has a groove that receives an edge portion of the piece of sheet which is cut off, which edge portion is in a state in which it hangs down after cutting, and wherein the movable blade comprises a disk which is rotatably supported, and the receiving element comprises a roller which is rotatably supported.

9. A sheet cutter for cutting a sheet piece from a sheet by shearing, the sheet cutter comprising:

a fixed blade;

a movable blade which is movable along the fixed blade;

an apparatus for estimating a lifetime of the movable blade, comprising a motor for driving the movable blade;

a detector for detecting a value of a parameter representing a cutting resistance during sheet cutting, wherein the parameter is a value of a current loaded on the motor;

a comparator for comparing the detected value of the parameter with a predetermined reference value, wherein the comparator determines that the movable blade is unfit for use when the value of the parameter exceeds the predetermined reference value; and an output element for outputting a result based on the comparison; and a receiving element which receives a sheet piece that is cut off from the sheet, the receiving element being structured so as to be movable together with the movable blade, wherein the receiving element has a groove that receives an edge portion of the piece of sheet which is cut off, which edge portion is in a state in which it hangs down after cutting.

* * * * *